(12) United States Patent
Czechtizky

(10) Patent No.: US 10,118,587 B2
(45) Date of Patent: Nov. 6, 2018

(54) HINGE APPARATUS WITH AN INTEGRATED PEDESTRIAN PROTECTION MEANS FOR A FRONT HOOD

(71) Applicant: Dr. Ing. h.c. F. Porsche Aktiengesellschaft, Stuttgart (DE)

(72) Inventor: Timo Czechtizky, Zell unter Aichelberg (DE)

(73) Assignee: DE. ING H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/652,618

(22) Filed: Jul. 18, 2017

(65) Prior Publication Data

US 2018/0022311 A1    Jan. 25, 2018

(30) Foreign Application Priority Data

Jul. 25, 2016   (DE) .......................... 10 2016 113 684

(51) Int. Cl.
| | |
|---|---|
| *B60R 21/38* | (2011.01) |
| *E05D 3/06* | (2006.01) |
| *E05D 11/10* | (2006.01) |
| *B60R 21/00* | (2006.01) |
| *E05D 11/00* | (2006.01) |

(52) U.S. Cl.
CPC .............. *B60R 21/38* (2013.01); *E05D 3/06* (2013.01); *E05D 11/1014* (2013.01); *B60R 2021/003* (2013.01); *E05D 11/00* (2013.01); *E05D 2011/009* (2013.01); *E05Y 2900/536* (2013.01)

(58) Field of Classification Search
CPC .......................... B60R 21/38; B60R 2021/003
See application file for complete search history.

(56) References Cited

U.S. PATENT DOCUMENTS

| | | | | |
|---|---|---|---|---|
| 6,329,910 B1 * | 12/2001 | Farrington | .......... | B60R 21/0136 180/282 |
| 6,439,330 B1 * | 8/2002 | Paye | ....... | B60R 21/38 180/274 |
| 6,834,735 B2 * | 12/2004 | Kim | ....... | B60R 21/38 180/274 |
| 7,380,625 B2 * | 6/2008 | Wang | ....... | B60R 21/38 180/274 |

(Continued)

FOREIGN PATENT DOCUMENTS

DE      10 2011 056 844      6/2013

*Primary Examiner* — Jeffrey O'Brien
(74) *Attorney, Agent, or Firm* — Gerald E. Hespos; Michael J. Porco; Matthew T. Hespos

(57) ABSTRACT

A hinge apparatus (1) for a front hood (2) of a motor vehicle has an integrated pedestrian protection that includes a hood-side fastening arrangement (4) articulated to a body-side fastening arrangement (6) via a link arrangement (5) that has a stop link (50). The hood-side fastening arrangement (4) has a hinge upper part (40) and a coupling (41), and the body-side fastening arrangement (6) has a lock (60) that acts on the coupling (41) to lock the hood (2) in a normal state and to unlock it by a pyrotechnical actuator (9) that acts on the lock (60) and the stop link (50). The pyrotechnical actuator (9) has a piston rod (90) and an ignition in a housing (92). A free end (91) of the piston rod (90) is articulated on the lock (60), and an opposite end (93) of the housing (92) is articulated on the stop link (50).

8 Claims, 5 Drawing Sheets

(56) References Cited

U.S. PATENT DOCUMENTS

| | | | |
|---|---|---|---|
| 7,552,789 B2 * | 6/2009 | Gust | B60R 21/38 180/69.21 |
| 7,594,555 B2 * | 9/2009 | Lutter | B60R 21/34 180/274 |
| 7,596,833 B2 * | 10/2009 | Erwin | B60R 21/38 16/370 |
| 7,854,289 B2 * | 12/2010 | Gust | B60R 21/38 180/274 |
| 7,896,122 B2 * | 3/2011 | Borg | B62D 25/12 180/274 |
| 7,913,795 B2 * | 3/2011 | Borg | B60R 21/38 180/274 |
| 8,201,306 B2 * | 6/2012 | Kim | E05C 17/32 16/357 |
| 8,484,804 B2 * | 7/2013 | Mehta | B60R 21/38 16/368 |
| 8,596,180 B2 * | 12/2013 | Schaefer | B60R 21/38 180/274 |
| 8,656,716 B2 * | 2/2014 | Schafer | B60R 21/38 60/407 |
| 8,768,574 B1 * | 7/2014 | Shaw | B60R 21/38 180/274 |
| 9,085,282 B2 * | 7/2015 | Agell Merino | E05D 11/00 |
| 9,283,924 B1 * | 3/2016 | Farooq | B60R 21/38 |
| 9,327,677 B2 * | 5/2016 | Fermer | E05D 3/125 |
| 9,366,066 B2 * | 6/2016 | Hwang | E05D 11/00 |
| 9,475,452 B2 * | 10/2016 | Lindmark | B62D 25/12 |
| 9,701,277 B2 * | 7/2017 | McIntyre | B60R 21/38 |
| 9,789,846 B2 * | 10/2017 | Henck | B60R 21/38 |
| 9,821,755 B2 * | 11/2017 | Farooq | B60R 21/013 |
| 9,855,916 B2 * | 1/2018 | Hwang | E05D 11/00 |
| 9,944,252 B2 * | 4/2018 | Wilmot | B60R 21/38 |
| 2005/0285431 A1 * | 12/2005 | Rex | B60R 21/38 296/187.04 |
| 2006/0108169 A1 * | 5/2006 | Borg | B60R 21/38 180/274 |
| 2013/0227818 A1 * | 9/2013 | Zippert | B60R 21/38 16/366 |
| 2017/0259776 A1 * | 9/2017 | McLundie | B60R 21/38 |
| 2017/0282847 A1 * | 10/2017 | Jenny | B60R 21/38 |
| 2017/0327074 A1 * | 11/2017 | Schabenberger | B62D 25/12 |
| 2017/0349137 A1 * | 12/2017 | Schaurer | B60R 21/38 |
| 2017/0369028 A1 * | 12/2017 | Patterson | B60R 21/38 |

* cited by examiner

HINGE APPARATUS WITH AN INTEGRATED PEDESTRIAN PROTECTION MEANS FOR A FRONT HOOD

CROSS REFERENCE TO RELATED APPLICATION

This application claims priority under 35 USC 119 to German Patent Appl. No. 10 2016 113 684.0 filed on Jul. 25, 2016, the entire disclosure of which is incorporated herein by reference.

BACKGROUND

1. Field of the Invention

The invention relates to a hinge apparatus with an integrated pedestrian protection means for a front hood of a body of a motor vehicle. The hinge apparatus comprises a hood-side fastening arrangement that is connected to a body-side fastening arrangement in an articulated manner via a link arrangement that has a stop link. The hood-side fastening arrangement has a hinge upper part and a coupling, and the body-side fastening arrangement having at least one lock that acts on the coupling to lock the front hood in the normal operating state and to unlock it by a pyrotechnical actuator in the case of an impact. The pyrotechnical actuator is arranged to act on the lock and on the stop link.

2. Description of the Related Art

The prior art includes hinges with an integrated, active pedestrian protection apparatus that erects the front hood of the motor vehicle in the case of a pedestrian impact to reduce the risk of injury for pedestrians. For example, DE 10 2011 056 844 A1 discloses a hinge apparatus with two closing elements that lock the front hood to the body in the normal operating state of the motor vehicle. The front hood is connected to the body in an articulated manner by a four-bar linkage arrangement. An actuator actuates a locking means in the case of a pedestrian impact so that the first closing element is released and the four-bar linkage arrangement can erect the front hood. The second closing element then is released so that the front hood is raised farther up on its rear edge to ensure the impact protection. The fact that the actuator acts directly via the locking element on the four-bar linkage arrangement results in an unfavorable speed profile of the rear edge of the front hood during the erection, which has a high speed toward the end of the erection movement and leads to disadvantageous vibrations of the front hood.

DE 20 2015 120 287.5 is not a prior publication, but also relates to a hinge with an integrated, active pedestrian protection apparatus. However, this hinge apparatus has a pyrotechnical actuator that requires a large installation space in the region of the lock.

It is an object of the invention to provide a hinge apparatus having an integrated, active pedestrian protection with a pyrotechnical actuator that requires less installation space.

SUMMARY

A hinge apparatus of the invention has pyrotechnical actuator with a housing. An axially movable piston rod and an ignition apparatus for triggering the piston rod are accommodated in the housing. The piston rod has a free end articulated on the lock, and the housing has an outer end that lies opposite the free end of the piston rod and is articulated on a stop link. The actuator is configured to act both on the locking means and on the stop link (preferably directly). Thus, the erection movement at a rear edge of the front hood advantageously has a speed profile with a very high speed at the beginning of the erection movement and a very low speed at the end of the erection movement. The articulation of the free end of the piston rod on the locking means and the articulation of the opposite outer end of the housing on the stop link results in installation space advantages in the area surrounding the point where the piston rod is articulated on the locking means of the body-side fastening arrangement.

The ignition apparatus may be accommodated within the housing in the vicinity of the outer end. Therefore, the ignition apparatus always is arranged "at the top" within the housing and the free end of the piston rod, in contrast, always is arranged "at the bottom".

The ignition apparatus may have at least one ignition cable that is guided out of the housing of the pyrotechnical actuator in the region of the outer end. Thus, there will be no constriction or a collision of the cable output of the at least one ignition cable with an end wall in the vicinity of the lock.

The hinge apparatus may comprise a first body-side stop element and a second body-side stop element. The first stop element may be assigned to the locking means and the second stop element may be assigned to the stop link of the link arrangement. This arrangement in combination with the arrangement of the pyrotechnical actuator between the lock and the stop link avoids disadvantageous cover vibrations toward the end of the erection movement of the front hood.

The link arrangement may have an upper link with a first end articulated on the body and a second end articulated on the coupling. A middle link may have a first end articulated on the upper link and a second end articulated on the stop link, and a lower link may have a first end articulated on the body and a second end articulated on the coupling.

The middle link and the stop link may be arranged to form a toggle lever arrangement with an articulation point formed by way of the second end of the middle link. This articulation point points in an angled manner in the direction of the locking element in the normal operating state.

The locking means can be configured as a hook. The piston rod of the actuator may act directly on the hook after the triggering of the actuator so that a closed position of the front hood can be canceled in a simple way.

The second stop element may be configured as a deformation element or has a predetermined break point. A defined compliance of the front hood in the case of a pedestrian impact can be set by way of this measure.

Further features and advantages of the invention become clear using the following description of one embodiment with reference to the appended drawings.

DETAILED DESCRIPTION

Figure 1:
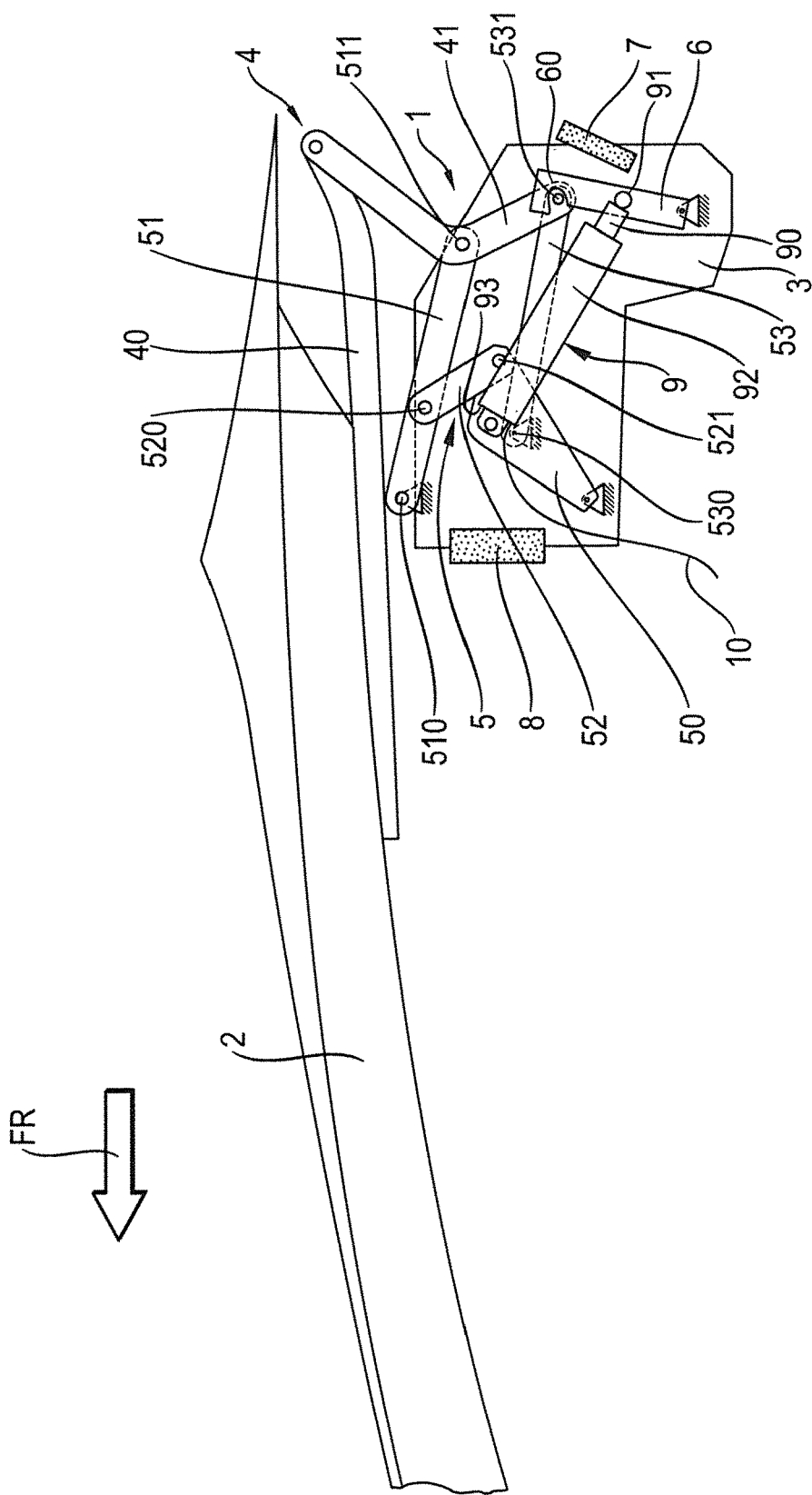
FIG. 1 is a diagrammatically simplified side view of a hinge apparatus for a front hood of a body of a motor vehicle, in a closed position of the front hood.

FIG. 1 is a diagrammatic side view of a hinge apparatus 1 with an integrated pedestrian protection means for a front hood 2 of a body 3 (shown only partially here) of a motor vehicle. The front hood 2 is in a closed position in this illustration. The driving direction of the motor vehicle has been symbolized by an arrow FR in this illustration.

The hinge apparatus 1 comprises a hood-side fastening arrangement 4 that has a hinge upper part 40 attached on an underside of the front hood 2, and a coupling 41. The hood-side fastening arrangement 4 is coupled to a body-side fastening arrangement 6 in an articulated manner via a link arrangement 5. The body-side fastening arrangement 6 has a lock 60 mounted pivotably on the body 3 and configured as a hook in the present. In the closed position of the front hood 2, the coupling 41 engages into the lock 60 and locks the front hood 2 in its closed position.

The link arrangement 5 has a stop link 50 mounted on the body 3, an upper link 51, a middle link 52 and a lower link 53. The upper link 51 has a first end 510 articulated on the body 3 and a second end 511 articulated on the coupling 41. The middle link 52 has a first end 520 articulated on the upper link 51 and a second end 521 articulated on the stop link 50. The lower link 53 has a first end 530 articulated on the body 3 and a second end 531 articulated on the coupling 41.

Furthermore, the hinge apparatus 1 has two stop elements 7, 8 which are attached on the body 3. A first stop element 7 is assigned to the body-side fastening arrangement 6 with the locking means 60, and a second stop element 8 which is configured in the present case as a deformation element is assigned to the stop link 50 of the link arrangement 5.

Moreover, the hinge apparatus comprises a pyrotechnical actuator 9 that is arranged to act both on the locking means 6 and on the stop link 50. The pyrotechnical actuator 9 has a housing 92 and an axially movable piston rod 90 is accommodated in the housing. The piston rod 90 has a free end articulated on the locking means 6. The housing 92 of the pyrotechnical actuator 9 has an outer end 93 opposite the free end 91 of the piston rod 90. The outer end 93 of the housing 92 is articulated on the stop link 50. An ignition apparatus (cannot be seen here explicitly) is accommodated in the housing 92 in the vicinity of the outer end 93. The ignition apparatus has at least one ignition cable 10 that is guided out of the housing 92 of the pyrotechnical actuator 9 in the region of the outer end 93. The ignition apparatus is capable of ensuring a short triggering time of the pyrotechnical actuator 9 for activating the axial movement of the piston rod 90.

The fact that the free end 91 of the piston rod 90 is articulated on the locking means 60 and the opposite outer end 93 of the housing 92 is articulated on the stop link 50 results in installation space advantages in the surrounding area of the articulation point, at which the piston rod 90 is articulated on the locking means 60. Thus, the ignition apparatus always is situated above the piston rod 90. These measures prevent a constriction and a collision of the cable output of the at least one ignition cable 10 with an end wall that is provided in the surrounding area of the locking means 6.

As shown in FIG. 1, the middle link 52 and the stop link 50 are configured and coupled to one another to form a toggle lever arrangement that is angled in the closed position of the front hood 2 and points with the articulation point formed by the second end 521 of the middle link 52 in the direction of the locking element 6.

Figure 2:
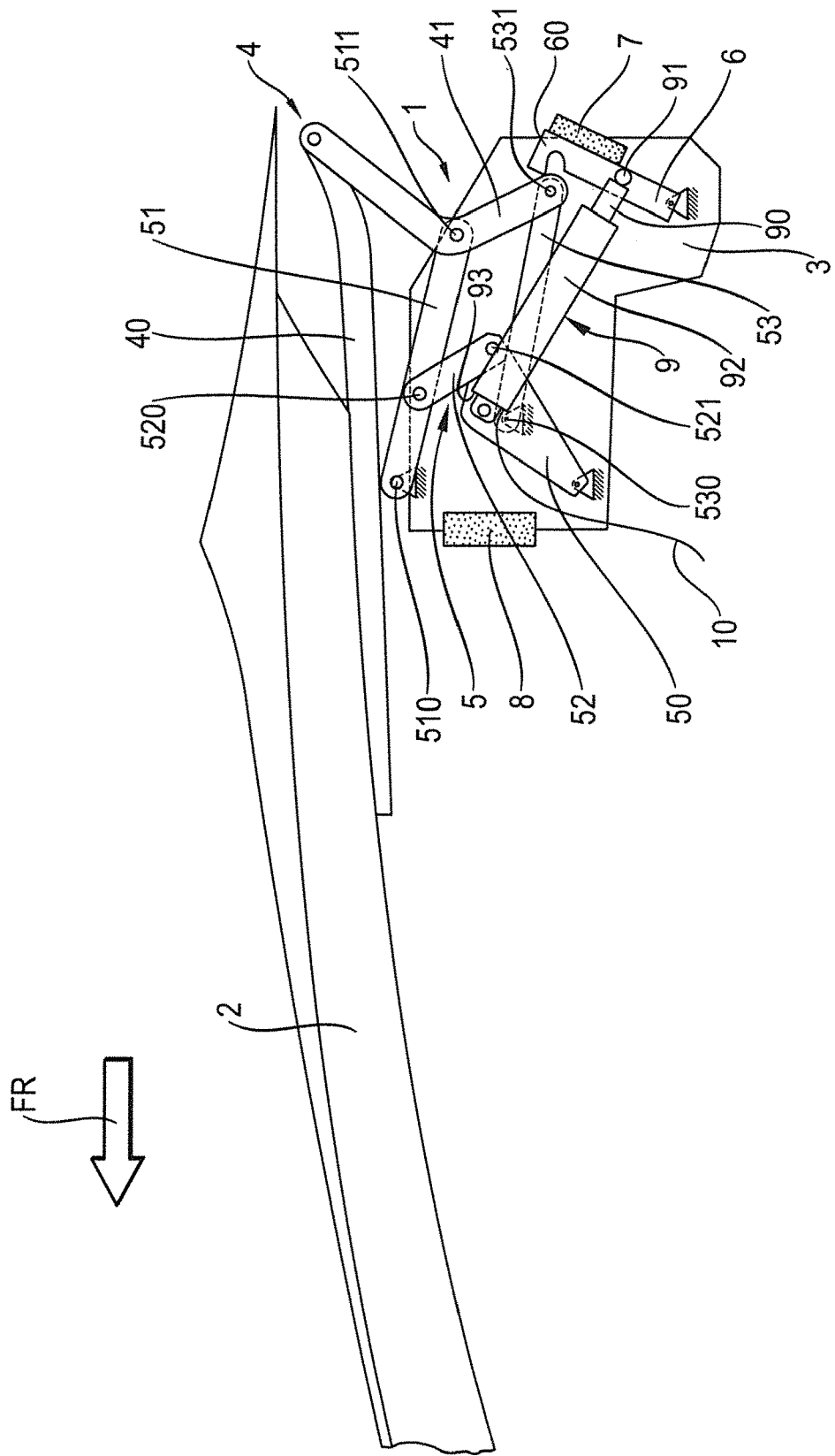
FIG. 2 shows the hinge apparatus of FIG. 1 after activation of a pyrotechnical actuator of the hinge apparatus.

If the ignition apparatus of the pyrotechnical actuator 9 is ignited in the case of the detection of a pedestrian impact, the piston rod 90 moves out in the axial direction. The middle link 52 and the stop link 50 form a toggle lever arrangement. Thus, the triggering of the pyrotechnical actuator 9 by ignition of the ignition apparatus initiates the axial movement of the piston rod 90, brings about a pivoting movement of the locking element 60 and therefore unlocks the front hood 2. As can be seen in FIG. 2, the locking element 60 is pivoted to come into contact with and to be supported on the first stop element 7.

Figure 3:
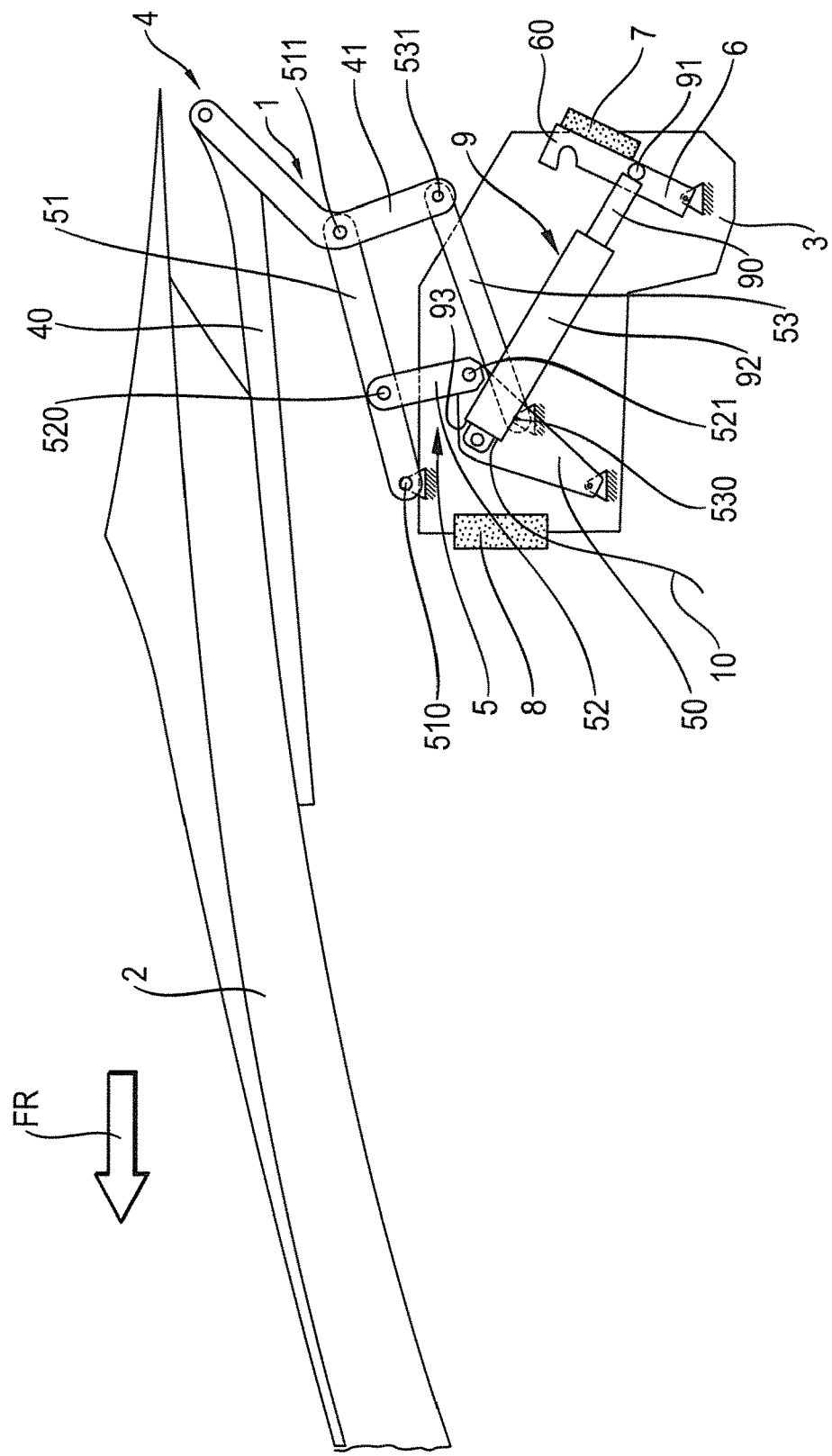
FIG. 3 shows the hinge apparatus of FIG. 1 in an intermediate position.
Figure 4:
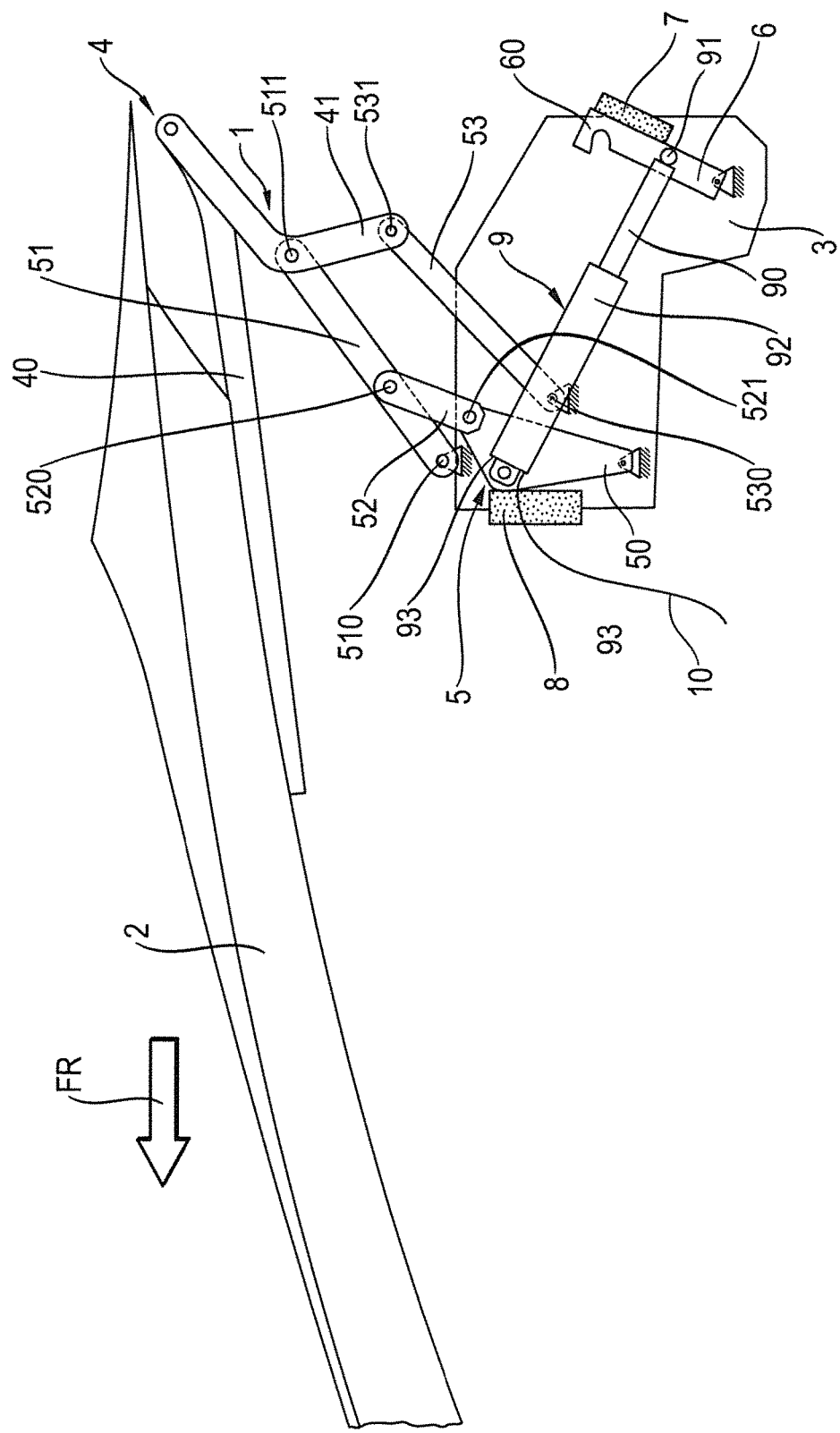
FIG. 4 shows the hinge apparatus of FIG. 1 in a completely extended position.

In an intermediate position of the hinge apparatus 1, as shown in FIG. 3, the further axial movement of the piston rod 90 of the actuator 9 then brings about a pivoting movement of the stop link 50 so that the toggle lever arrangement is moved in the direction of a beyond dead center position. The front hood 2 also is moved up and is transferred into a pedestrian protection end position, as shown in FIG. 4. The stop link 50 bears against the second stop element 8. The toggle lever arrangement formed from the middle link 52 and the stop link 50 is locked in a beyond dead center position.

Figure 5:
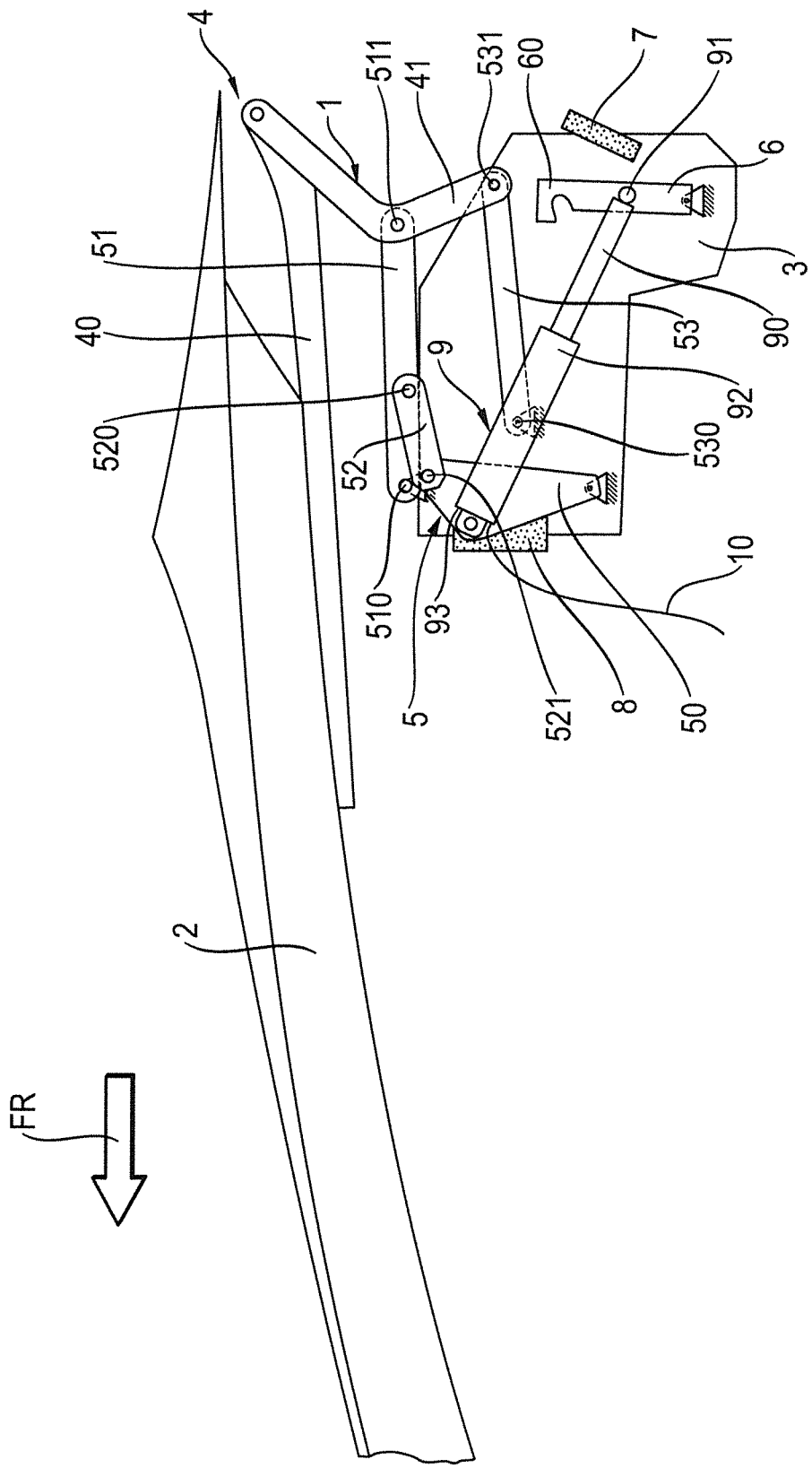
FIG. 5 shows the hinge apparatus according to FIG. 1 in a load case.

Finally, FIG. 5 shows the load case, in which a pedestrian hits the front hood 2, and the front hood 2 yields, with the result that serious injuries of the pedestrian can be prevented. The stop link 50 can move farther in the direction of the second stop element 8 by configuring the second stop element 8 as a deformation element that can correspondingly be deformed. The second stop element 8 can also have a predetermined break point in an alternative embodiment. The hinge apparatus 1 advantageously makes a yielding movement of the stop link 50 and a compliance of the front hood 2 possible in the case of a pedestrian impact.

What is claimed is:

1. A hinge apparatus with an integrated pedestrian protection for a front hood of a body of a motor vehicle, comprising: a hood-side fastening arrangement articulated to a body-side fastening arrangement via a link arrangement that has a stop link, the hood-side fastening arrangement having a hinge upper part and a coupling, and the body-side fastening arrangement having at least one lock that acts on the coupling and locks the front hood in a normal operating state and unlocks the front hood via a pyrotechnical actuator in response to an impact, the pyrotechnical actuator being arranged to act on the at least one lock and on the stop link, the pyrotechnical actuator having a housing, a piston rod axially movable in the housing and an ignition apparatus in the housing for triggering the piston rod, the piston rod having a free end articulated on the at least one lock, and the housing having an outer end opposite the free end of the piston rod and articulated on the stop link, wherein upon activation of the pyrotechnical actuator, the piston rod pivots the at least one lock to release the coupling and the housing pivots the stop link to move the front hood into a pedestrian protection position.

2. The hinge apparatus of claim 1, wherein the ignition apparatus is accommodated within the housing in proximity to the outer end.

3. The hinge apparatus of claim 2, wherein the ignition apparatus has at least one ignition cable that is guided out of the housing of the pyrotechnical actuator in proximity to the outer end.

4. The hinge apparatus of claim 1, wherein the hinge apparatus comprises a first body-side stop element and a second body-side stop element, the first body-side stop element being positioned to engage the at least one lock and the second body-side stop element being positioned to engage the stop link of the link arrangement.

5. The hinge apparatus of claim 1, wherein the link arrangement has an upper link with a first end articulated on the body and a second end articulated on the coupling, a middle link having a first end articulated on the upper link and a second end articulated on the stop link, and a lower link having a first end articulated on the body and a second end articulated on the coupling.

6. The hinge apparatus of claim 5, wherein the middle link and the stop link form a toggle lever arrangement with an articulation point formed by the second end of the middle link pointing toward the at least one lock in the normal operating state.

7. The hinge apparatus of claim 1, wherein the at least one lock is a hook.

8. The hinge apparatus of claim 4, wherein the second body-side stop element is configured as a deformation element or has a predetermined break point.

* * * * *